H. A. TOZIER.
Bee Hive.
No. 58,697. Patented Oct. 9, 1866.
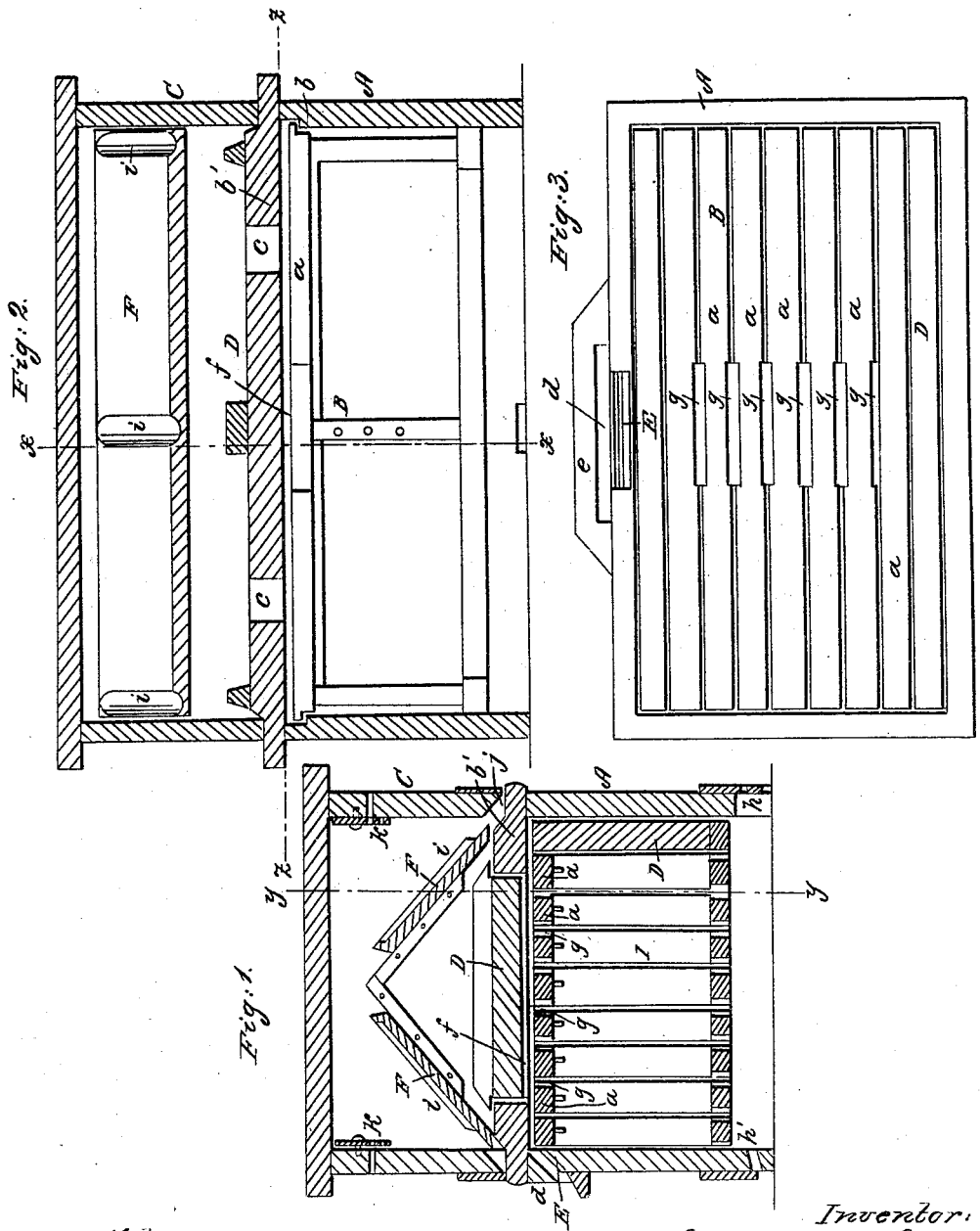
Witnesses:
J. W. B. Covington
Wm Treurn
Inventor:
Henry A. Tozier
Per Munn & Co.
Attorneys.

UNITED STATES PATENT OFFICE.

HENRY A. TOZIER, OF LITTLETON, MAINE.

IMPROVEMENT IN BEE-HIVES.

Specification forming part of Letters Patent No. 58,697, dated October 9, 1866.

*To all whom it may concern:*

Be it known that I, HENRY A. TOZIER, of Littleton, in the county of Aroostook and State of Maine, have invented a new and Improved Bee-Hive; and I do hereby declare that the following is a full, clear, and exact description thereof, which will enable others skilled in the art to make and use the same, reference being had to the accompanying drawings, forming a part of this specification, in which—

Figure 1 is a transverse vertical section of my invention, taken in the line *x x*, Fig. 2; Fig. 2, a longitudinal vertical section of the same, taken in the line *y y*, Fig. 1; Fig. 3, a horizontal section of the same, taken in the line *z z*, Fig. 2.

Similar letters of reference indicate like parts.

This invention relates to a new and useful improvement in the construction of bee-hives, as hereinafter fully shown and described, whereby several advantages are obtained over the ordinary hives, such as a more thorough protection against the bee-moth, proper ventilation, security against cold, &c.

A represents the body or main portion of the hive, which incloses the comb-frames B. This body or main portion is of rectangular form, the frames B being suspended within it by means of the ends of thin top bars, *a*, resting upon shoulders *b* at the upper part of A, as shown clearly in Fig. 2. The top of the body A has a plate, *b'*, attached to it, commonly termed the "honey-board," on which the spare-honey boxes rest, said boxes being covered by a case, C. This plate *b'* has a rectangular opening made in it, in which opening a square lid, D, is placed, rather shorter than the opening, to allow a bee-passage, *c*, at each end. (See Fig. 2.)

The bee-entrance E is at one side of the upper part of A, and is covered or protected by a cap-plate, *d*, as shown clearly in Fig. 1, the alighting-board *e* being directly underneath the entrance E, a space, *f*, being allowed between the tops of the comb-frames and the plate *b'* for the bees to pass over the tops of the frames B, as shown in Fig. 1. The top bars, *a*, of the frames B are notched at their centers, as shown at *g*, to admit of the bee-workers passing down into the body of the hive, (see Figs. 2 and 3,) and the lower part of the body A is provided with openings *h h'*, one of which, *h*, may serve as an entrance or passage for the queen and drones, when necessary, and both serve as ventilators when desired.

Within the body A of the hive there is placed a solid plate or board, D', of about the same width as a comb-frame. This board admits of the frames B being adjusted together in contact, and by removing said board the comb-frames may be spread apart. This is done in winter, and it allows the bees to cluster much more compactly than they otherwise could, and to keep the hive comfortable by animal heat, and a strong healthy colony will be insured.

By having the bee-entrance at the top of the hive several advantages are obtained. The bees are kept in a cluster, and the miller will have no opportunity to enter the hive, and deposit its eggs, on account of the entrance being well guarded. The reverse is the case when the entrance is at the bottom of the hive, as the bees are above, and the lower parts of the combs are unprotected. A moth-miller can enter where a worker-bee can, and hence the only remedy against the moth is a strong and a well-guarded entrance.

Another advantage of the elevated entrance is that the bees can readily pass up through the passages *c* into the spare-honey boxes, the entrance E being equally as convenient to them as to the comb-frames, and much labor is saved the bees thereby, as they are not compelled to travel over the combs in a heavily-leaden condition, as is now the case, in order to reach the spare-honey boxes.

The cap-plate *d* darkens the entrance E, and prevents the queen and drones from endeavoring to get out at that place. They frequently collect during the time of swarming at an entrance visible by light, and greatly obstruct the passage, interfering with the ingress and egress of the workers.

During warm weather the opening *h'* may be uncovered, and the bees will cluster out at this place, leaving the entrance in front entirely free, and the opening *h* is uncovered whenever it is desired to allow the queen and drones to pass out. This opening may be provided with a button or slide, which will admit of its capacity being graduated to admit of the queen and drones passing out, or to admit only the workers to pass out. When the is weak it should be kept closed entirely.

The case C covers the spare boxes, and within said case there are placed two inclined boards, F F, the upper surfaces of which are grooved, as shown at $i$, said grooves leading down to apertures $j$ in the lower edges of the case C. These inclined boards allow of the escape of the moisture from the case C, the vapor ascending into the upper part of said case, and when condensed, by coming in contact with the inner surfaces thereof, dropping upon the boards F F, and escaping through $j$. Ventilators $k$ are placed in the upper parts of the sides of the case C.

Having thus described my invention, what I claim as new, and desire to secure by Letters Patent, is—

The removable plate or board D, placed within the body A of the hive, substantially in the manner as and for the purpose herein set forth.

HENRY A. TOZIER.

Witnesses:
RICHARD R. TOZIER,
ERNEST W. TOZIER.